(12) United States Patent
Dalal et al.

(10) Patent No.: US 8,797,589 B2
(45) Date of Patent: Aug. 5, 2014

(54) COLOR MANAGEMENT AND CALIBRATION USING A SCANNER OR CAMERA

(75) Inventors: Edul N. Dalal, Webster, NY (US); Wencheng Wu, Webster, NY (US)

(73) Assignee: Xerox Corporation, Norwalk, CT (US)

(*) Notice: Subject to any disclaimer, the term of this patent is extended or adjusted under 35 U.S.C. 154(b) by 322 days.

(21) Appl. No.: 12/859,760

(22) Filed: Aug. 19, 2010

(65) Prior Publication Data
US 2012/0044540 A1 Feb. 23, 2012

(51) Int. Cl.
| G06K 15/00 | (2006.01) |
| G06F 15/00 | (2006.01) |
| H04N 1/407 | (2006.01) |
| H04N 1/46 | (2006.01) |
| G03F 3/08 | (2006.01) |

(52) U.S. Cl.
USPC .......... 358/1.18; 358/1.9; 358/3.26; 358/504; 358/521; 702/85

(58) Field of Classification Search
USPC ............... 358/1.18, 1.9, 3.26, 504, 534, 521; 702/85
See application file for complete search history.

(56) References Cited

U.S. PATENT DOCUMENTS

| 5,412,491 | A  | 5/1995  | Bachar |
| 6,360,007 | B1 | 3/2002  | Robinson et al. |
| 6,384,918 | B1 | 5/2002  | Hubble, III et al. |
| 6,870,636 | B2 | 3/2005  | Kulkarni |
| 6,975,949 | B2 | 12/2005 | Mestha et al. |
| 7,024,152 | B2 | 4/2006  | Lofthus et al. |
| 7,136,616 | B2 | 11/2006 | Mandel et al. |
| 2004/0114164 | A1* | 6/2004 | Linder et al. .................. 358/1.9 |
| 2004/0130739 | A1* | 7/2004 | Adam et al. ................... 358/1.9 |
| 2005/0071104 | A1* | 3/2005 | Viturro et al. ................. 702/85 |
| 2006/0285134 | A1* | 12/2006 | Viturro et al. ................ 358/1.9 |

OTHER PUBLICATIONS

Wu et al., Imaging Colorimetry Using a Digital Camera, Journal of Imaging Science and Technology, Jul./Aug. 2000, vol. 44, No. 4, pp. 267-279.

* cited by examiner

*Primary Examiner* — Marivelisse Santiago Cordero
*Assistant Examiner* — Temitayo Folayan
(74) *Attorney, Agent, or Firm* — Pillsbury Winthrop Shaw Pittman, LLP

(57) ABSTRACT

A computer-implemented method for color calibration and profiling of an output device includes measuring a color patch in a test pattern, which comprises a plurality of color patches, to obtain first image data; measuring the color patch in the test pattern to obtain second image data; transforming the first image data to a first estimated image data; determining a difference between the second image data and the first estimated image data to obtain a correction factor; and calculating, for each patch in the test pattern, a corrected image data by applying the correction factor to a subsequent estimated image data from the first sensor. The correction factor is used for correcting inaccuracies introduced when the first image data is transformed into the first estimated image data. The first image data and the second image data provide a measured color representation of the color patch in a device dependent color space and a device independent color space, respectively.

16 Claims, 4 Drawing Sheets

COLOR MANAGEMENT AND CALIBRATION USING A SCANNER OR CAMERA

BACKGROUND

1. Field

The present disclosure relates to a method and a system for color calibration and color profiling of an image output device, such as an image printing device.

2. Description of Related Art

Some image printing devices have inline color measurement equipment, such as an inline spectrophotometer (ILS), to perform color management functions (e.g., color profiling and color calibration). On the other hand, some image printing devices have a full width array (FWA) or partial width array (PWA) scan bar to evaluate and/or correct image quality variation in the cross-process direction of the image printing device.

The ILS is used for color management. While the ILS contributes significantly to better performance (i.e., productivity and customer convenience), the ILS measures the color (e.g., in a device independent color space, such as L*a*b*) at only one location in a cross-process direction of the image printing device, unless more than one ILS is used, which is more expensive. Consequently, when using a single ILS, only a few color patches can be measured on a page (e.g., 11 patches on a letter-size page). Since hundreds, or even thousands, of color patches are needed for color management functions, such as generating a destination profile for the printer or populating a spot color table, hundreds of pages are wasted each time such color management functions are updated. Moreover, the ILS cannot perform important uniformity measurements, such as IBOB (inboard-outboard) color variation. The inboard-outboard color variation in the print quality may be due to several factors, such as pressure variation across the length of the transfer nip.

Some image printing devices use an inline full-width array (FWA) scan bar for color management instead of the ILS. The FWA measures an image at all locations in the cross-process direction, and at high resolution (e.g., 600 dpi). The FWA measures many hundreds of patches on a page. However, the FWA typically provides only three channel (RGB) information at each pixel, instead of the reflectance spectrum (e.g., 31 wavelengths from 400 nm to 700 nm) provided by the ILS. It is possible to profile a scanner, such as a FWA scan bar, to generate color (L*a*b*) data from the RGB signals, but with available technology this can only be done approximately. The accuracy attainable is quite inadequate for some color management functions, such as generating a destination profile for the printer or populating a spot color table.

Therefore, it is desirable to have a system that provides color measurements that are sufficiently accurate for color management functions (i.e., like the ILS) and provides color measurements at many locations in the cross-process direction (i.e., like the FWA) to enable color management or calibration in fewer pages. It is also desirable for such system to perform color uniformity measurements accurately.

The present disclosure provides improvements in methods and systems for color calibration and color profiling of the image output devices.

SUMMARY

According to one aspect of the present disclosure, a computer-implemented method for color calibration and profiling of an output device is provided. The method is implemented in a computer system comprising one or more processors configured to execute one or more computer program modules. The method includes measuring a color patch in a test pattern, which comprises a plurality of color patches, using a first sensor to obtain first image data; measuring the color patch in the test pattern using a second sensor to obtain second image data; transforming the first image data to a first estimated image data; determining a difference between the second image data and the first estimated image data to obtain a correction factor, the correction factor for correcting inaccuracies introduced when the first image data is transformed into the first estimated image data; and calculating, for each patch in the test pattern, a corrected image data by applying the correction factor to a subsequent estimated image data from the first sensor. The first image data provides a measured color representation of the color patch in a device dependent color space. The second image data provides a measured color representation of the color patch in a device independent color space. The first estimated image data provides an estimated color representation of the first image data in the device independent color space.

According to another aspect of the present disclosure, a system for color calibration and profiling of an output device is provided. The system includes a print engine, a first sensor, a second sensor, and a processor. The print engine is configured to print a test pattern comprising a plurality of patches thereon. The first sensor is configured to measure a color patch in the test pattern to obtain first image data. The first image data provides a measured color representation of the color patch in a device dependent color space. The second sensor is configured to measure the color patch in the test pattern to obtain second image data. The second image data provides a measured color representation of the color patch in a device independent color space. The processor is configured to: a) transform the first image data to a first estimated image data; b) determine a difference between the second image data and the first estimated image data to obtain a correction factor; and c) calculate, for each patch in the test pattern, a corrected image data by applying the correction factor to a subsequent estimated image data from the first sensor. The first estimated image data provides an estimated color representation of the first image data in the device independent color space. The correction factor is used for correcting inaccuracies introduced when the subsequent image data is transformed into the subsequent estimated image data.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 2:
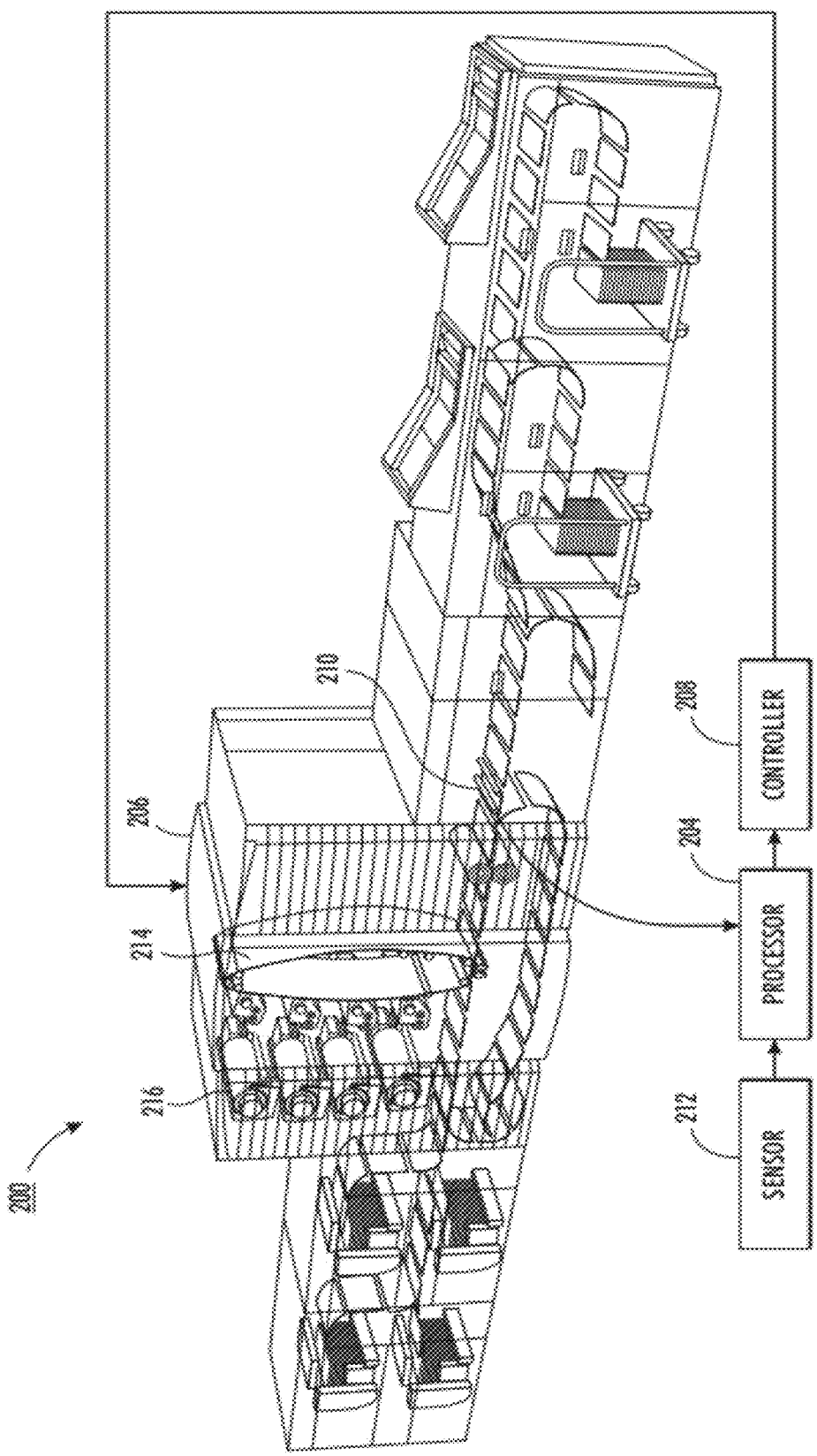
FIG. 2 illustrates a system for color calibration and color profiling of the image output device in accordance with an embodiment of the present disclosure.

An image printing system 200, as shown in FIG. 2, generally has two important directions: a process (or a slow scan) direction and a cross-process (or a fast scan) direction. The direction in which an image bearing surface 214, as shown in FIG. 2, moves is referred to as the process (or the slow scan) direction, and the direction perpendicular to the process (or the slow scan) direction is referred to as the cross-process (or the fast scan) direction.

The generation of color documents includes an image output step, where the image is printed by a color printer or other image output device. Most color output devices either use cyan, magenta and yellow signals in a CMY color space or in a CMYK with an additional color signal for black. The color signals used for image output devices are also usually device-dependent. Instead of transferring color signals in the RGB space from a scanner directly to color signals in the CMYK space to a color printer, a device-independent color space is commonly used as the intermediate color space for other evolved image processing, such as compression, decompression, enhancement, correction, and the like.

The device independent color spaces are also often standard color spaces, such as the XYZ space, with X, Y and Z color signals, the CIE Lab space with L*, a* and b* signals, and the YCbCr space with Y, Cb and Cr signals. The device-independent color spaces unambiguously define color information that is not limited by the dynamic range or color gamut of any physically realizable device.

The most common color transformations are those for converting colors between a device-dependent color space and a device-independent color space. For the image input step, the transformation might be from an RGB color space to the CIE Lab color space. For the output step, the transformation might be from the CIE Lab color space to a CMYK color space.

In general, traditional methods of scanner profiling are used to transform the color data (e.g., obtained from a scanner or a linear array sensor) in the device dependent color space to the device independent color space. These traditional methods of scanner profiling include for example a matrix method or a look-up table (LUT) method.

In the matrix method, a matrix, M, relates a RGB input to a L*a*b* output. The matrix, M may be a 3X3 matrix. The application of the matrix method is expressed using Equation (1):

$$[L^*a^*b^*] = [RGB] \cdot M \qquad \text{Equation (1)}$$

where
  M is a 3×3 matrix derived from the training data set;
  [L*a*b*] is output data in the device independent color space, such as a L*a*b* color space; and
  [R G B] is input data in the device dependent color space, such as RGB color space.

W. Wu, J. P. Allebach, Mostafa Analoui, "Imaging Colorimetry Using a Digital Camera," Journal of Imaging Science and Technology, Vol. 44, No. 4, pp. 267-279, July/August 2000 discloses exemplary matrix methods, and is herein incorporated by reference in its entirety.

Performance of the matrix method may be improved by using the matrix to relate RGB input to XYZ output, which is linear in reflectance like RGB, and then converting XYZ output to L*a*b* using standard formulas. Further improvements may be obtained by using a 4×3 matrix, where the additional row represents the offset terms.

In the LUT method, a transformation that maps a RGB input to a L*a*b* output is generally in the form of a look-up table and often involves interpolation using available LUT entries. The LUT method is generally more accurate than the matrix method since the LUT method captures some local behavior of the relationship between RGB data and L*a*b* data. In the LUT method, a simple mapping or transformation T relates an RGB input to a L*a*b* output. The application of the LUT method is expressed using Equation (2):

$$[L^*a^*b^*] = [RGB] \cdot T \qquad \text{Equation (2)}$$

where
  T is a transformation or mapping derived from the training data set;
  [L*a*b*] is an output in the device independent color space, such as a L*a*b* color space; and
  [R G B] is an input in the device dependent color space, such as a RGB color space.

U.S. Pat. Nos. 5,412,491; 6,360,007 and 6,870,636 disclose exemplary LUT methods. These patents are herein incorporated by reference in their entirety.

These traditional methods (i.e., the matrix method and the LUT method) of scanner profiling have limited accuracy. That is, the level of accuracy obtained using these traditional methods is inadequate for color management. There are several reasons for this poor accuracy, for example, (a) available scanner models that convert the RGB channels to color (L*a*b*) do not describe the system model accurately and (b) integrating cavity effects (ICE) which cause the color measured on a particular pixel to depend on the color of surrounding pixels over a fairly large area.

The present disclosure exploits the observation that the traditional methods of scanner profiling, even the simple matrix methods, have very good relative accuracy, even though their absolute accuracy is poor.

Figure 1:
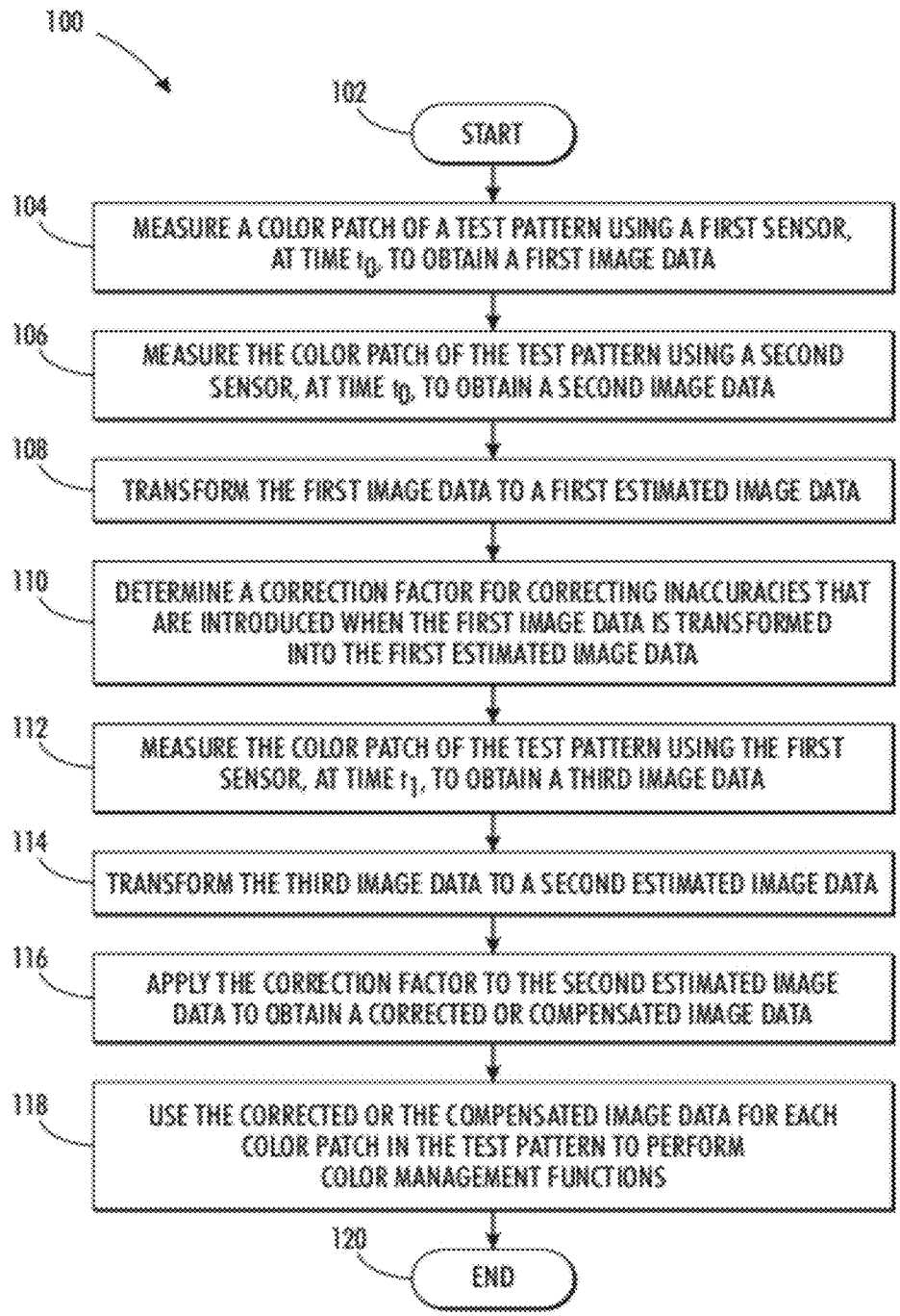
FIG. 1 illustrates a method for color calibration and color profiling of an image output device in accordance with an embodiment of the present disclosure.

FIG. 1 illustrates a method 100 for color calibration and color profiling of an image output device in accordance with an embodiment of the present disclosure. The method 100 of the present disclosure uses a correction term E which empirically accounts for both the sources of error mentioned above. The method of the present disclosure works very well when certain conditions are satisfied: (1) the colors to be measured on the scanner are not very different from those used in deriving the scanner correction, and (2) the colors surrounding any given target color patch remain approximately constant. These conditions are well satisfied when conducting color management functions using a fixed test pattern (e.g., an IT8 test pattern for destination profiling of the image printing device, or some fixed pattern of spot colors for generating spot color emulation tables). The correction factor E is obtained through a calibration process and is applied to subsequent color measurements as long as the scanner profile still accurately measures the relative color changes. The method 100 also internally determines when the scanner profile needs to be refreshed.

The method 100 measures image color at many locations in a cross-process direction using an in-line full width array (FWA) or partial width array (PWA) scan bar (or even an offline scanner) and with sufficient accuracy for typical color management functions (e.g., generating a destination profile for the image printing system or populating a spot color table). Also, even though the method 100 of the present disclosure does not replace a spectrophotometer for all applications, the method 100 is quite capable of performing typical color management functions. With FWAs or scanners measuring many test patches simultaneously, the method 100 allows frequent in-line profiling, color monitoring, etc.

FIG. 1 provides the method 100 for color calibration and profiling of the image output system 200 (as shown and explained with respect to FIG. 2). The method 100 is a computer-implemented method that is implemented in a computer system comprising one or more processors 204 (as shown in and explained with respect to FIG. 2) configured to execute one or more computer program modules.

Figure 3:
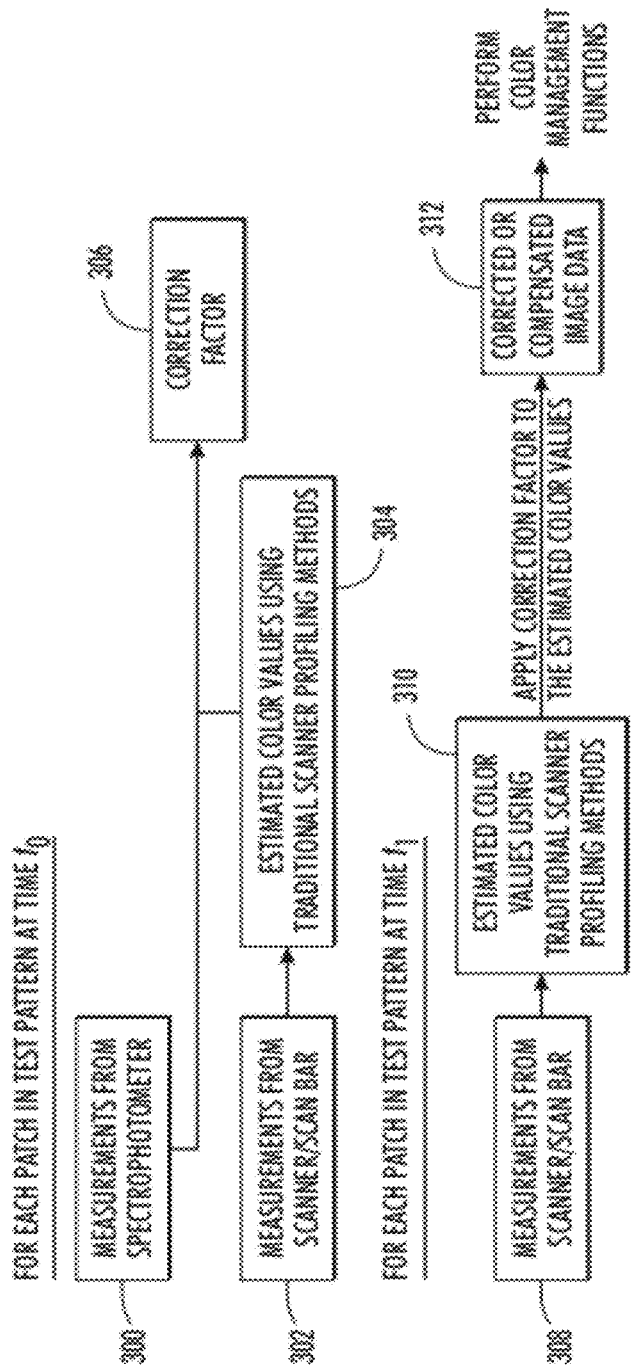
FIG. 3 illustrates a flow diagram representation of the system (i.e., for color calibration and color profiling of the image output device) providing an embodiment for operation of the disclosed method.

The method 100 begins at procedure 102. At procedure 104, a color patch of a test pattern is measured using a first sensor to obtain a first image data 302 (as shown in FIG. 3). The first image data is represented by [$R_i$ $G_i$ $B_i$], where i represents color patch i of the test pattern.

The test pattern is a fixed test pattern that includes a plurality of color patches. For example, the fixed test pattern includes the plurality of patches represented by $p_i$(c,m,y,k;x, y), where $p_i$ are the plurality of patches, where i is 1 to N; c, m, y, and k are color coordinates; and x and y are location coordinates.

In one embodiment, the test pattern is an IT8 test pattern. The IT8 test pattern is an industry-standard test pattern/target that contains for example 264 color patches plus 24 shades of gray. In general, the IT8 test pattern is widely used in color management.

In one embodiment, the first sensor is an in-line linear array sensor, such as an in-line full width array (FWA) scan bar or partial width array (PWA) scan bar or camera. In another embodiment, the first sensor is an offline camera or scanner.

In general, a full width array sensor is defined as a sensor that extends substantially an entire width (perpendicular to a direction of motion) of the moving image bearing surface 214 (e.g., photoreceptor belt). The full width array sensor is configured to detect any desired part of the printed image or control patches, while printing real images. The full width array sensor may include a plurality of sensors equally spaced at intervals (e.g., every 1/600th inch (600 spots per inch)) in the cross-process (or a fast scan) direction. See, for example, U.S. Pat. No. 6,975,949, incorporated herein by reference in its entirety. It is understood that other linear array sensors may also be used, such as contact image sensors, CMOS array sensors or CCD array sensors. Although the full width array (FWA) sensor or contact sensor is shown in the illustrated embodiment, it is contemplated that the present disclosure may use sensor chips that are significantly smaller than the width of the image bearing surface 214, through the use of reductive optics. In one embodiment, the sensor chips may be in the form of an array that is, for example, one or two inches long and that manages to detect the entire area across the image bearing surface 214 through reductive optics. In one embodiment, the processor 204 is provided to both calibrate the linear array sensor and to process the reflectance data detected by the linear array sensor. It could be dedicated hardware like ASICs or FPGAs, software, or a combination of dedicated hardware and software.

The first image data 302 (as shown in FIG. 3) provides a measured color representation of the color patch in the device dependent color space. As discussed above, the device dependent color space defines a color in terms specific to the device. For example, the device dependent color space may be defined by a coordinate system defining color values as point coordinates. In one embodiment, the device dependent color space is a scanner color space. An example of the device dependent space is RGB color space.

At procedure 106, the color patch of the test pattern is measured using a second sensor to obtain a second image data 300 (as shown in FIG. 3). The second image data is represented by [$L_i$ $a_i$ $b_i$], where i represents color patch i of the test pattern. The second image data 300 provides a measured color representation of the color patch in the device independent color space.

In one embodiment, the second sensor is an in-line spectrophotometer. In another embodiment, the second sensor is an offline spectrophotometer. In general, the spectrophotometer provides spectral information comprising a representative signal of the printed colors of an image and preferably comprises L*, a*, b* values, XYZ values, etc., depending on the desired color description. One such spectrophotometer may be that disclosed in U.S. Pat. No. 6,384,918 by Hubble, III et al. for a SPECTROPHOTOMETER FOR COLOR PRINTER COLOR CONTROL WITH DISPLACEMENT INSENSITIVE OPTICS, the disclosure of which is hereby incorporated by reference in its entirety. The spectrophotometer is for non-contact measurement of colored target areas such as test patches on moving printed test sheets in an output path of a color printer, where test patches may be sequentially illuminated with multiple different colors of light (from multiple illumination sources which may comprise approximately ten or more individual LEDs), and a photosensor providing electrical signals in response. The spectrophotometer includes a lens system for transmitting that reflected illumination from the test patch to the photosensor.

As noted above, the device independent color space defines a color in terms of a standard color space or a colorimetric specification. Colors defined in the device independent color space may be more accurately reproduced on various different devices, such as printers. One example of a device independent color space is a luminance-chrominance space, denoted generically as $LC_1C_2$. Another example of a luminance-chrominance space is CIE L*a*b*. Some other standard color spaces are, for example, CIE XYZ, sRGB, and Adobe RGB.

At procedure 108, the first image data 302 (as shown in FIG. 3) is transformed to a first estimated image data 304 (as shown in FIG. 3). The first estimated image data 304 provides an estimated color representation of the first image data 302 in the device independent color space. The first estimated image data 304 is represented by [$\hat{L}_i$ $\hat{a}_i$ $\hat{b}_i$], where i represents color patch i of the test pattern. This transformation may be done using the matrix method or the LUT method described above.

When the matrix method is used, the first estimated image data is obtained using Equation (3):

$$[\hat{L}_i \hat{a}_i \hat{b}_i] = [R_i G_i B_i] \cdot M \qquad \text{Equation (3)}$$

where

M is a matrix that represents scanner profiles derived at time $t_0$ using the fixed test pattern;

i represents color patch i of the test pattern;

[$\hat{L}_i$ $\hat{a}_i$ $\hat{b}_i$] is the first estimated image data; and

[$R_i$ $G_i$ $B_i$] is the first image data (i.e., outputs measured by the first sensor).

When the LUT method is used, the first estimated image data is obtained using Equation (4):

$$[\hat{L}_i \hat{a}_i \hat{b}_i] = T([R_i G_i B_i]) \qquad \text{Equation (4)}$$

where

T is a LUT transformation or mapping that represents scanner profiles derived at time $t_0$ using the fixed test pattern;

i represents color patch i of the test pattern;
$\lfloor \hat{L}_i, \hat{a}_i, \hat{b}_i \rfloor$ is the first estimated image data; and
$[R_i, G_i, B_i]$ is the first image data (i.e., outputs measured by the first sensor).

At procedure 110, a correction factor 306 (as shown in FIG. 3) for correcting inaccuracies introduced when the first image data 302 is transformed into the first estimated image data 304 is determined. The correction factor is determined by calculating a difference between the second image data 300 and the first estimated image data 304.

The patch specific correction factor $E_i$ at time $t_0$ is obtained using Equation (5):

$$E_i = [L_i a_i b_i] - \lfloor \hat{L}_i \hat{a}_i \hat{b}_i \rfloor \qquad \text{Equation (5)}$$

where
$E_i$ is a patch specific correction factor at time $t_0$ that corrects inaccuracies introduced when the first image data is transformed into the first estimated image data;
i represents color patch i of the test pattern;
$\lfloor \hat{L}_i, \hat{a}_i, \hat{b}_i \rfloor$ is the first estimated image data; and
$[L_i, a_i, b_i]$ is the second image data (i.e., outputs measured by the second sensor).

The correction factor is color dependent and location dependent. For each color in the fixed test pattern, a correction factor is determined. The correction factor for each color patch in the test pattern is obtained using the procedures 104-110. In other words, these procedures 104-110 are repeated for each color patch in the test pattern to obtain the correction factor for that color patch in the test pattern. For example, if there are 968 color patches on the fixed test pattern, then the 968 correction factors are determined and saved. On the other hand, the traditional method for scanner profiling does not have the correction term $E_i$.

At procedure 112, the same fixed test pattern is printed again, at time $t_1$, to update the destination profile. The color patch in the fixed test pattern is measured, at time $t_1$, using the first sensor to obtain a third image data 308 (as shown in FIG. 3). The third image data provides a measured color representation of the color patch in the device dependent color space. The third image data is represented by $[R'_i, G'_i, B'_i]$, where i represents color patch i of the test pattern. Even though the same patch and the same first sensor are used, the third image data, $[R'_i, G'_i, B'_i]$ is different from the first image data, $[R_i, G_i, B_i]$. This is due to the fact that the image printing device drifts or changes its behavior over time (i.e., from time $t_0$ to time $t_1$), thus, the image printing device produces a different color even though the inputs are the same.

At time $t_1$, the same fixed test pattern is printed again to update the destination profile, but instead of using the second sensor (e.g., spectrophotometer) to measure the color, the patch of the fixed test pattern is measured using the first sensor to obtain the newly measured (or third) image data, $[R'_i, G'_i, B'_i]$.

At procedure 114, the third image data, $[R'_i, G'_i, B'_i]$ is transformed into a second estimated image data 310 (as shown in FIG. 3). The second estimated image data 310 is represented by $[R'_i, G'_i, B'_i] \cdot M$ or $T([R'_i, G'_i, B'_i])$, depending on whether the matrix method or the LUT method is used for transformation of the third image data $[R''_i, G'_i, B'_i]$. The second estimated image data ($[R'_i, G'_i, B'_i] \cdot M$ or $T([R'_i, G'_i, B'_i])$) provides an estimated color representation of the third image data $[R'_i, G'_i, B'_i]$ in the device independent color space.

At procedure 116, the correction factor $E_i$ is applied to the second estimated image data ($[R'_i, G'_i, B'_i] \cdot M$ or $T([R'_i, G'_i, B'_i])$) to obtain a corrected or compensated image data 312 (as shown in FIG. 3). The corrected or compensated image data 312 is represented by $\lfloor \hat{L}'_i, \hat{a}'_i, \hat{b}'_i \rfloor$, where i represents the color patch i in the test pattern.

The corrected or compensated image data $\lfloor \hat{L}'_i \hat{a}'_i \hat{b}'_i \rfloor$ is obtained using Equation (6) or (7) depending on whether the matrix method or the LUT method is used for transformation of the third image data $[R'_i G'_i B'_i]$:

$$\lfloor \hat{L}'_i \hat{a}'_i \hat{b}'_i \rfloor = [R'_i G'_i B'_i] \cdot M + E_i \qquad \text{Equation (6)}$$

where
$\lfloor \hat{L}'_i, \hat{a}'_i, \hat{b}'_i \rfloor$ is the corrected or compensated image data;
i represents color patch i of the test pattern;
$E_i$ is the patch specific correction factor $E_i$ at time $t_0$ that is obtained at Equation (5);
$[R'_i, G'_i, B'_i]$ is the third image data (i.e., outputs measured by the first sensor at time $t_1$); and
M is a matrix that represents scanner profiles derived at time $t_0$ using the fixed test pattern.

$$\lfloor \hat{L}'_i \hat{a}'_i \hat{b}'_i \rfloor = T([R'_i G'_i B'_i]) + E_i \qquad \text{Equation (7)}$$

where
$\lfloor \hat{L}'_i, \hat{a}'_i, \hat{b}'_i \rfloor$ is the corrected or compensated image data;
i represents color patch i of the test pattern;
$E_i$ is the patch specific correction factor $E_i$ at time $t_0$ that is obtained at Equation (5);
$[R'_i, G'_i, B'_i]$ is the third image data (i.e., outputs measured by the first sensor at time $t_1$); and
T is a LUT transformation or mapping that represents scanner profiles derived at time $t_0$ using the fixed test pattern.

The method 100 of the present disclosure is configured to work as long as the scanner profile generated by this method accurately measures the relative color changes between time $t_0$ and time $t_1$. If the colors do not change from time $t_0$ to time $t_1$, the estimated colors ($[R'_i, G'_i, B'_i] \cdot M$ or $T([R'_i, G'_i, B'_i])$) from the method 100 of the present disclosure are identical to the measurements from the spectrophotometer (except for measurement noise). If the colors change moderately from time $t_0$ to time $t_1$, the method 100 of the present disclosure performs much better than the traditional methods. As the change in the colors from time $t_0$ to time $t_1$ increases, scanner accuracy decreases.

The corrected or the compensated image data for each color patch in the test pattern is obtained using the procedures 112-116. In other words, these procedures 112-116 are repeated for each color patch in the test pattern to obtain the corrected or the compensated image data for that color patch in the test pattern.

At procedure 118, the corrected or the compensated image data obtained for each color patch in the test pattern is used to perform color management functions. These color management functions may include (a) performing calibration of the output device, (b) generating a destination profile for the output device, or (c) checking color performance of the output device against predetermined specifications. The method 100 ends at procedure 120.

As discussed above in the method 100 of the present disclosure, the scan bar or the scanner is calibrated by measuring the fixed test pattern using the spectrophotometer. Once that is done, color measurements are measured using only the scan bar or the scanner (i.e., without using the spectrophotometer). As the image printing device drifts away from the calibration state, the error due to the method 100 may slowly increase, and eventually the error may exceed a tolerance or a predetermined threshold value. When the error exceeds the threshold value, the scanner needs to be recalibrated. How often a recalibration needs to be performed depends on the image printing device. For example, more stable image printing devices require scanner calibration less frequently.

The method 100 is also configured to internally check for the change of the image printing device, and indicate when recalibration of the scanner is needed (i.e., when the error due to drift has exceeded a threshold value). For example, this is done by evaluating the color difference between the current print, and the print on which calibration was performed. This is estimated from the output of the 3×3 matrix. This relationship will depend on the system (printer, scanner, etc.) but can be readily determined for any given system.

Figure 4A:
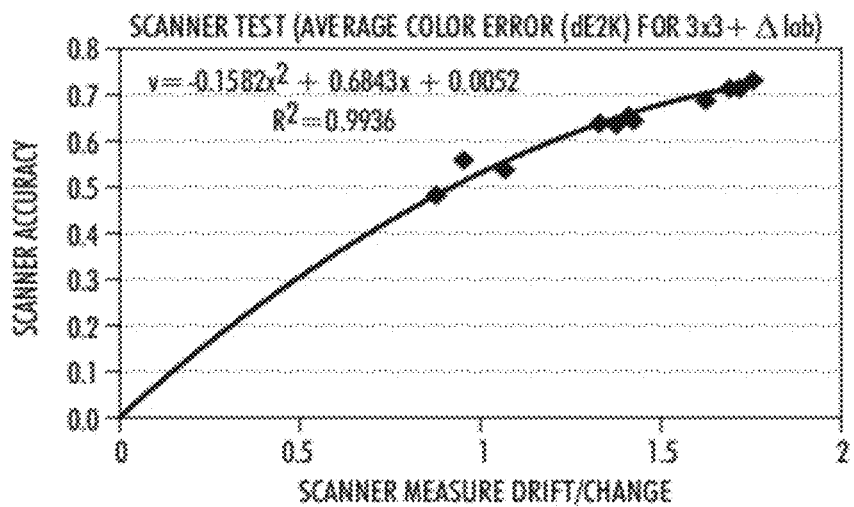
FIG. 4A is a graphical representation of scanner accuracy as a function of drift or change in an image printing device in accordance with an embodiment of the present disclosure.
Figure 4B:
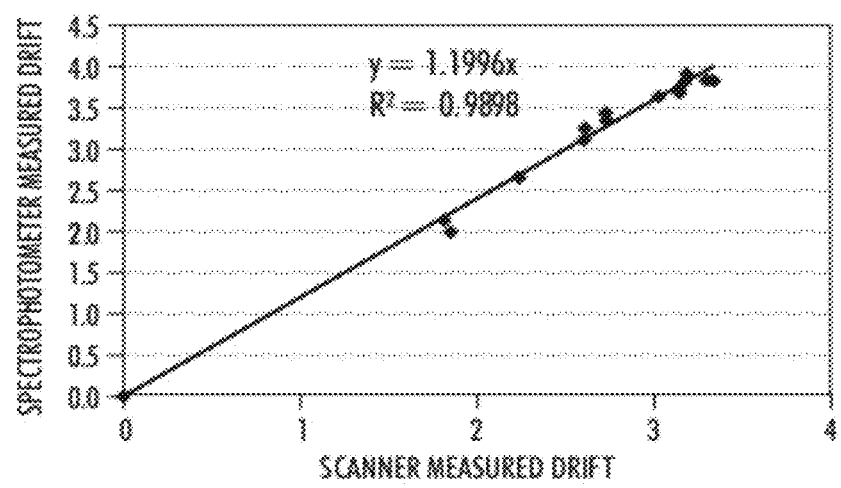
FIG. 4B is a graphical representation of the actual drift or change in an image printing device as a function of that measured by the scanner in accordance with an embodiment of the present disclosure.

The exemplary graphs shown in FIGS. 4A and 4B show some data on printer drift or change in color, as measured by the scanner. The exemplary graph shown in FIG. 4A represents scanner accuracy in terms of the average color error (dE2K) for an image printing device "A". The exemplary graph shown in FIG. 4B represents the drift or change in the color of the image printing device "A" as measured by a spectrophotometer, as a function of the same drift or change as measured by the scanner.

From the exemplary graph shown in FIG. 4A, it is seen that the accuracy of color measurements by the scanner gradually decreases (greater color error) as the image printing device drifts or changes further from the state it was in at time $t_0$, when the scanner was calibrated. From the exemplary graph shown in FIG. 4B, it is seen that the drift or change in the color of image printing device, as measured by the spectrophotometer, is linearly related to that as measured by the scanner, and the actual printer drift (as measured by the spectrophotometer) is approximately 1.2 times that of the scanner measured drift (in terms of dE2K).

If it is determined that the image printing device needs scanner calibration, then the procedures 102-110 are performed to determine correction factors for each color patch of the fixed test pattern. In one embodiment, the procedures 102-110 are performed by diagnostics personnel using an off-line spectrophotometer. In another embodiment, the procedures 102-110 are performed automatically using an inline spectrophotometer. As noted above, once the correction factors are determined, color measurements are measured using only the scan bar or scanner (i.e., without using the spectrophotometer). That is, procedures 112-116 are repeated for each color patch in the test pattern to obtain the corrected or compensated image data for that color patch in the test pattern.

FIG. 2 shows the exemplary image printing system 200 incorporating the system (i.e., for color calibration and color profiling of the image printing system) of the present disclosure. The image printing system 200 includes a printing engine 206, the processor 204, a controller 208, a first sensor 210, and a second sensor 212.

As illustrated, the print engine 206 is a multi-color engine having a plurality of imaging/development subsystems 216, that are suitable for producing individual color images (e.g., CMYK) on the image bearing surface 214, where the image bearing surface 214 then transfers the images to the substrate. The image printing system 200 also includes a source of paper or printable substrates.

As is generally known, to generate an output copy of an input document, the image bearing surface 214 is charged using a corona charger (not shown) and then exposed to a raster output scanner (laser) (not shown) to form the latent image on the image bearing surface 214. Toner is applied to the latent image from a plurality of developer units 216. The toner applied to the latent image is transferred to the output media at a transfer station. The output media is moved by a transport mechanism to a fuser so that the toner is permanently affixed to the output media.

Referring to FIGS. 2 and 3, the print engine 206 is configured to print a test pattern comprising a plurality of patches thereon. The first sensor 210 is configured to measure a color patch in the test pattern, at time $t_0$, to obtain the first image data 302. As noted above, the first image data 302 provides a measured color representation of the color patch in the device dependent color space. At time $t_1$, the first sensor 210 is further configured to measure the color patch in the test pattern to obtain the third image data 308. As noted above, the third image data 308 provides a measured color representation of the color patch in the device dependent color space.

The second sensor 212 is for example an offline spectrophotometer, and is configured to measure the color patch in the test pattern, at time $t_0$, to obtain the second image data 300. As noted above, the second image data 300 provides a measured color representation of the color patch in the device independent color space.

The processor 204 can comprise either one or a plurality of processors therein. Thus, the term "processor" as used herein broadly refers to a single processor or multiple processors. In one embodiment, the processor 204 can be a part of or forming a computer system. The system 200 may include a memory to store data received and data generated by the processor 204.

The processor 204 is configured to: a) transform the first image data 302 to the first estimated image data 304; b) determine a difference between the second image data 300 and the first estimated image data 304 to obtain the correction factor 306; and c) calculate, for each patch in the test pattern, the corrected image data 312 by applying the correction factor to subsequent estimated image data. The first estimated image data 304 provides an estimated color representation of the first image data 302 in the device independent color space. The correction factor 306 corrects inaccuracies introduced when the first image data 302 is transformed into the first estimated image data 304.

The processor 204 is further configured (a) to transform the third image data 308 to the subsequent or second estimated image data 310; and (b) apply the correction factor 306 to the subsequent or second estimated image data 310 to obtain the corrected image data 312. The subsequent or second estimated image data 310 providing an estimated color representation of the third image data 308 in the device independent color space The controller 208 is configured to use the corrected or compensated image data 312 to (a) perform calibration of the output device, (b) generate a destination profile for the output device, or (c) check color performance of the output device against predetermined specifications using the corrected image data obtained for each color patch in the test pattern.

Using the fixed test pattern, 15 print samples were collected from two different image printing devices over several different jobs. All 236 patches on each of the 15 print samples were measured using a spectrophotometer, and also using a scanner.

First, traditional methods of scanner profiling were performed and evaluated, for example, using a 3×3 matrix method, a 4×3 matrix method, and an LUT-based method. The scanner profiling was performed using the scanner data and the spectrophotometer data for print #1 only to obtain M, T, and then $E_i$. In other words, the data (the scanner data and the spectrophotometer data) obtained for print #1 is representative of the data that is obtained at time $t_0$. Each of these scanner profiling methods was used to predict all the colors on each of the remaining 14 prints using only the scanner RGB data for those prints.

The spectrophotometer data for the remaining prints (from print #2 to print #15) was used as a reference to determine the errors in the predicted colors. The results are presented in Table 1. Table 1 presents a summary of color errors (dE2K) for the remaining prints using traditional methods of scanner profiling.

The 3×3 matrix method produced very large errors, with average error dE2K≈6. The 4×3 matrix produced slightly smaller errors, with average error dE2K≈4. The LUT method produced the smallest errors, with average error dE2K≈1, but the 95th percentile errors were dE2K≈3.5, and the maximum errors were almost 10. These errors are too large for good color management.

TABLE 1

|  |  | Ave | P95 | Max |
| --- | --- | --- | --- | --- |
| Printer "A" | Baseline (LUT) | 1.0 | 3.4 | 6.7 |
|  | Baseline (4 × 3) | 4.2 | 8.8 | 11.9 |
|  | Baseline (3 × 3) | 5.8 | 11.2 | 13.2 |
| Printer "B" | Baseline (LUT) | 1.0 | 3.6 | 9.3 |
|  | Baseline (4 × 3) | 4.3 | 11.4 | 15.6 |
|  | Baseline (3 × 3) | 6.0 | 12.6 | 14.3 |

The correction term E obtained in accordance with an embodiment of present disclosure was applied. That is, the correction term $E_i$ for each patch (e.g., patch i) was calculated by comparing the scanner data and the spectrophotometer data for that patch (i.e., patch i) in print #1 only (of the 15 print samples). The correction term $E_i$ calculated from print #1 was then applied to the scanner data (or the scanner predicted colors) for that patch (i.e., patch i), on each of the remaining prints (from print #2 to print #15). The spectrophotometer data for the remaining prints (from print #2 to print #15) was used as a reference to determine the errors in the predicted colors. The results are presented in Table 2. Table 2 presents a summary of color errors (dE2K) for remaining prints using the method of the present disclosure.

TABLE 2

|  |  | Ave | P95 | Max |
| --- | --- | --- | --- | --- |
| Printer "A" | LUT + ΔLab | 0.7 | 1.8 | 4.0 |
|  | 4 × 3 + ΔLab | 0.6 | 1.2 | 1.6 |
|  | 3 × 3 + ΔLab | 0.7 | 1.3 | 1.8 |
| Printer "B" | LUT + ΔLab | 0.6 | 1.9 | 4.1 |
|  | 4 × 3 + ΔLab | 0.4 | 0.8 | 1.3 |
|  | 3 × 3 + ΔLab | 0.4 | 0.8 | 1.3 |

As shown in Table 2, the color errors for the LUT method were reduced almost in half in comparison with the case, shown in Table 1, where the correction term was not applied. More significantly, the errors of the simple matrix methods (both 3×3 matrix and 4×3 matrix) were even better, with average error only dE2K≈0.4 and 95th percentile error only dE2K≈0.8. Therefore, as can be seen from Tables 1 and 2, when the correction term $E_i$ of the present disclosure was used, the color errors (dE2K) obtained were small enough for color management applications.

Thus, the method provides a novel scanner profiling method. As noted above, the method is not universally applicable. In other words, the method does not let a scanner replace a spectrophotometer for all applications, but the method of the present disclosure is quite capable of performing typical color management functions (e.g., generating a destination profile for the image printing system or populating a spot color table). The method provides a correction that is used to make the transformation of values in the color dependent space to the color independent space accurate.

The embodiments described may also be advantageously used for tightly integrated parallel printing (TIPP) systems. Such systems are known where multiple printers are controlled to output a single print job, as disclosed in U.S. Pat. Nos. 7,136,616 and 7,024,152, each of which herein is incorporated by reference in its entirety. Other devices, especially multi-function devices, may use offline scanners and the method of the present disclosure with offline scanners to perform color management functions.

In embodiments of the present disclosure, the processor, for example, may be made in hardware, firmware, software, or various combinations thereof. The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for color profiling of a scanning device, wherein the method is implemented in a computer system comprising one or more processors configured to execute one or more computer program modules, the method comprising:

measuring at least one color patch in a test print, which is produced by an output device based on a fixed test pattern and comprising a predetermined set of colors, using the scanning device to obtain first image data, the first image data providing a measured color representation of the at least one color patch in a scanning device dependent color space;

measuring the same at least one color patch in the test print using a reference instrument to obtain second image data, the second image data providing a measured color representation of the at least one color patch in a device independent color space;

transforming the first image data to a first estimated image data, the first estimated image data providing an estimated color representation of the first image data in the device independent color space;

determining a difference between the second image data and the first estimated image data for correcting inaccuracies introduced when the first image data is transformed into the first estimated image data, wherein the determined difference is for the same at least one color patch in the test print; and calculating, for each color patch in the test print, a corrected image data by adding the determined difference to a subsequent estimated image data from the scanning device, wherein the calculating the corrected image data comprises:

(a) measuring the at least one color patch in another test print, produced by the output device based on the same fixed test pattern, using the scanning device to obtain third image data, the third image data providing a measured color representation of the at least one color patch in the scanning device dependent color space, and the third image data being different from the first image data and being produced at the same output device at a different time;

(b) transforming the third image data to the subsequent estimated image data, the third estimated image data providing an estimated color representation of the third image data in the device independent color space; and (c) adding the determined difference of the at least one color patch to the subsequent estimated image data to obtain the corrected image data for that at least one color patch.

2. The method of claim 1, wherein the scanning device is a scanner or a camera.

3. The method of claim 1, wherein the reference instrument is a spectrophotometer.

4. The method of claim 1, wherein the device dependent color space is an RGB color space.

5. The method of claim 1, wherein the device independent color space is one of an L*a*b* color space, and an XYZ color space.

6. The method of claim 1, wherein the scanning device is configured to be inline with the output device.

7. The method of claim 1, wherein the transforming the first image data to the first estimated image data is performed using a look-up table, a 3×3 matrix model, or a 3×3 matrix model with offset terms.

8. The method of claim 1, wherein the fixed test pattern is an industry standard IT8 test pattern having 264 color patches and 24 shades of gray.

9. A system for color profiling of a scanning device, wherein the system comprising:

an output device configured to print a test print comprising a predetermined set of colors thereon based on a fixed test pattern;

a scanning device configured to measure at least one color patch in the test print to obtain first image data, the first image data providing a measured color representation of the at least one color patch in a scanning device dependent color space;

a reference instrument configured to measure the same at least one color patch in the test print to obtain second image data, the second image data providing a measured color representation of the at least one color patch in a device independent color space; and a processor configured to:

a) transform the first image data to a first estimated image data, the first estimated image data providing an estimated color representation of the first image data in the device independent color space;

b) determine a difference between the second image data and the first estimated image data for correcting inaccuracies introduced when the first image data is transformed into the first estimated image data, wherein the determined difference is for the same at least one color patch in the test print; and c) calculate, for each color patch in the test print, a corrected image data by adding the determined difference to a subsequent estimated image data from the scanning device, wherein the scanning device is further configured to measure the at least one color patch in another test print, produced by the output device based on the same fixed test pattern, to obtain third image data, the third image data providing a measured color representation of the at least one color patch in the scanning device dependent color space and the third image data being different from the first image data and being produced by the same output device at a different time, wherein the processor is further configured:

(a) to transform the third image data to the subsequent estimated image data, the subsequent estimated image data providing an estimated color representation of the third image data in the device independent color space; and (b) to add the determined difference of the at least one color patch to the subsequent estimated image data to obtain the corrected image data for the at least one color patch.

10. The system of claim 9, wherein the scanning device is a scanner or a camera.

11. The system of claim 9, wherein the reference instrument is a spectrophotometer.

12. The system of claim 9, wherein the device dependent color space is an RGB color space.

13. The system of claim 9, wherein the device independent color space is an L*a*b* color space or an XYZ color space.

14. The system of claim 9, wherein the scanning device is configured to be inline with the output device.

15. The system of claim 9, wherein the first image data is transformed to the first estimated image data using a look-up table, a 3×3 matrix model, or a 3×3 matrix model with offset terms.

16. The system of claim 9, wherein the scanning device is a full width array sensor or a partial width array sensor.

* * * * *